(12) United States Patent
McConnell et al.

(10) Patent No.: US 12,403,435 B2
(45) Date of Patent: Sep. 2, 2025

(54) STORAGE DUST COVER FOR A STAND MIXER BOWL

(71) Applicant: WHIRLPOOL CORPORATION, Benton Harbor, MI (US)

(72) Inventors: Jessica R. McConnell, St. Joseph, MI (US); John W. McConnell, St. Joseph, MI (US); John Jay Myers, Saugatuck, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 808 days.

(21) Appl. No.: 17/585,851

(22) Filed: Jan. 27, 2022

(65) Prior Publication Data
US 2023/0264157 A1 Aug. 24, 2023

(51) Int. Cl.
| | | |
|---|---|---|
| *B01F 35/00* | (2022.01) | |
| *A47J 43/07* | (2006.01) | |
| *B01F 35/45* | (2022.01) | |
| *B01F 101/06* | (2022.01) | |

(52) U.S. Cl.
CPC .......... *B01F 35/45* (2022.01); *A47J 43/0727* (2013.01); *B01F 2101/06* (2022.01)

(58) Field of Classification Search
CPC .... B01F 35/45; B01F 2101/06; A47J 43/0727
See application file for complete search history.

(56) References Cited

U.S. PATENT DOCUMENTS

| | | | |
|---|---|---|---|
| 2,504,727 A | 4/1950 | Post | |
| 2,802,499 A * | 8/1957 | Tupper | A47J 43/0727 D7/391 |
| 2,858,118 A | 10/1958 | Perkins | |
| 3,913,896 A | 10/1975 | Hawke | |
| 5,660,469 A | 8/1997 | Seguin | |
| 6,435,708 B1 | 8/2002 | Huang | |
| 8,985,839 B2 | 3/2015 | Seidler et al. | |
| 2012/0170404 A1* | 7/2012 | Drees | B01F 27/96 366/204 |

FOREIGN PATENT DOCUMENTS

| | | |
|---|---|---|
| GB | 1006382 B | 5/2009 |
| WO | 2015059455 A1 | 4/2015 |

* cited by examiner

*Primary Examiner* — Anshu Bhatia
(74) *Attorney, Agent, or Firm* — Price Heneveld LLP

(57) ABSTRACT

A dust cover for a stand mixer bowl includes a disc-shaped body defining a central aperture therethrough and extending from the central aperture to an outer extent and a rim extending from the outer extent of the disc-shaped body to define an interior portion of the dust cover with the disc-shaped body. The interior portion of the dust cover is configured to removably receive an upper portion of a mixing bowl with the disc-shaped body extending inwardly from a lip of the mixing bowl positioned adjacent the outer extent of the disc-shaped body over at least a portion of an interior of the mixing bowl. The central aperture is configured for a portion of a planetary hub of a stand mixer to extend therethrough with an outer surface of the portion of the planetary hub adjacent an inner edge of the central aperture.

12 Claims, 5 Drawing Sheets

STORAGE DUST COVER FOR A STAND MIXER BOWL

BACKGROUND OF THE DISCLOSURE

The present disclosure generally relates to a dust cover for a stand mixer bowl, and more specifically, to a dust cover adapted to be used with the mixing bowl when mounted on the associated stand mixer.

Stand mixers are generally configured to be interoperable with a number of interchangeable mixing bowls. These mixing bowls are coupled with the stand mixer in a variety of ways to be removable from the stand mixer, either to add ingredients or remove mixed food products or to interchange with different mixing bowls. Users typically store one or more mixing bowls in place on the mixer, typically for space-saving purposes, and may additionally store smaller bowls and/or mixing accessories within a larger mixing bowl. In this type of arrangement, the interior of the bowl or bowls and/or the accessories may be susceptible to gathering dust. Particularly, when the bowls and/or accessories are stored with the outermost bowl coupled with the stand mixer, a typical closed dust cover may not be compatible with certain features of the stand mixer, including an implement attachment output and/or the related planetary hub that drives movement of the output, which may interfere with the central portion of the dust cover that is disposed therebetween. Some stand mixers and/or associated mixing bowls may include so-called "splash guards" in the form of annular devices configured to rest over the outer edge of a mixing bowl and are open toward the center thereof to allow operation of the stand mixer and the introduction of ingredients. Such devices, however, may not be suitable for use as a dust cover because they do not fit closely enough to the stand mixer to prevent the entry of dust or other items when the stand mixer and bowl(s) are being stored.

SUMMARY OF THE DISCLOSURE

According to one aspect of the present disclosure, a dust cover for a stand mixer bowl includes a disc-shaped body defining a central aperture therethrough and extending from the central aperture to an outer extent and a rim extending from the outer extent of the disc-shaped body to define an interior portion of the dust cover with the disc-shaped body. The interior portion of the dust cover is configured to removably receive an upper portion of a mixing bowl with the disc-shaped body extending inwardly from a lip of the mixing bowl positioned adjacent the outer extent of the disc-shaped body over at least a portion of an interior of the mixing bowl. The central aperture is configured for a portion of a planetary hub of a stand mixer to extend therethrough with an outer surface of the portion of the planetary hub adjacent an inner edge of the central aperture when the dust cover receives the upper portion of the mixing bowl when the mixing bowl is coupled to the stand mixer in a storage position thereof.

According to another aspect of the present disclosure, a mixing bowl assembly for use with a stand mixer includes a mixing bowl having a body extending to a lip and defining an interior cavity and a dust cover having a disc-shaped body defining a central aperture therethrough and extending from the central aperture to an outer extent and a rim extending from the outer extent of the disc-shaped body to define an interior portion of the dust cover with the disc-shaped body. An upper portion of the mixing bowl is received within the interior portion of the dust cover, with the disc-shaped body extending inwardly from the lip of the mixing bowl positioned adjacent the outer extent of the disc-shaped body, over at least a portion of an interior of the mixing bowl. The central aperture is configured for a portion of a planetary hub of a stand mixer to extend therethrough into the interior cavity of the mixing bowl with an outer surface of the portion of the planetary hub adjacent an inner edge of the central aperture when the dust cover receives the upper portion of the mixing bowl and the mixing bowl is coupled to the stand mixer in a storage position thereof.

According to yet another aspect of the present disclosure, a stand mixer includes a base having a bowl coupler, a mixing head coupled with the base and having an output hub extending therefrom, a mixing bowl having a base removably coupled with the bowl coupler and a body extending from the base to a lip and defining an interior cavity, and a dust cover. The dust cover has a disc-shaped body defining a central aperture therethrough and extending from the central aperture to an outer extent and a rim extending from the outer extent of the disc-shaped body to define an interior portion of the dust cover with the disc-shaped body. An upper portion of the mixing bowl is received within the interior portion of the dust cover, with the disc-shaped body extending inwardly from the lip of the mixing bowl positioned adjacent the outer extent of the disc-shaped body, over at least a portion of an interior of the mixing bowl. The central aperture is configured for a portion of a planetary hub to extend therethrough into the interior cavity of the mixing bowl with an outer surface of the portion of the planetary hub adjacent an inner edge of the central aperture.

These and other features, advantages, and objects of the present disclosure will be further understood and appreciated by those skilled in the art by reference to the following specification, claims, and appended drawings.

Figure 1:
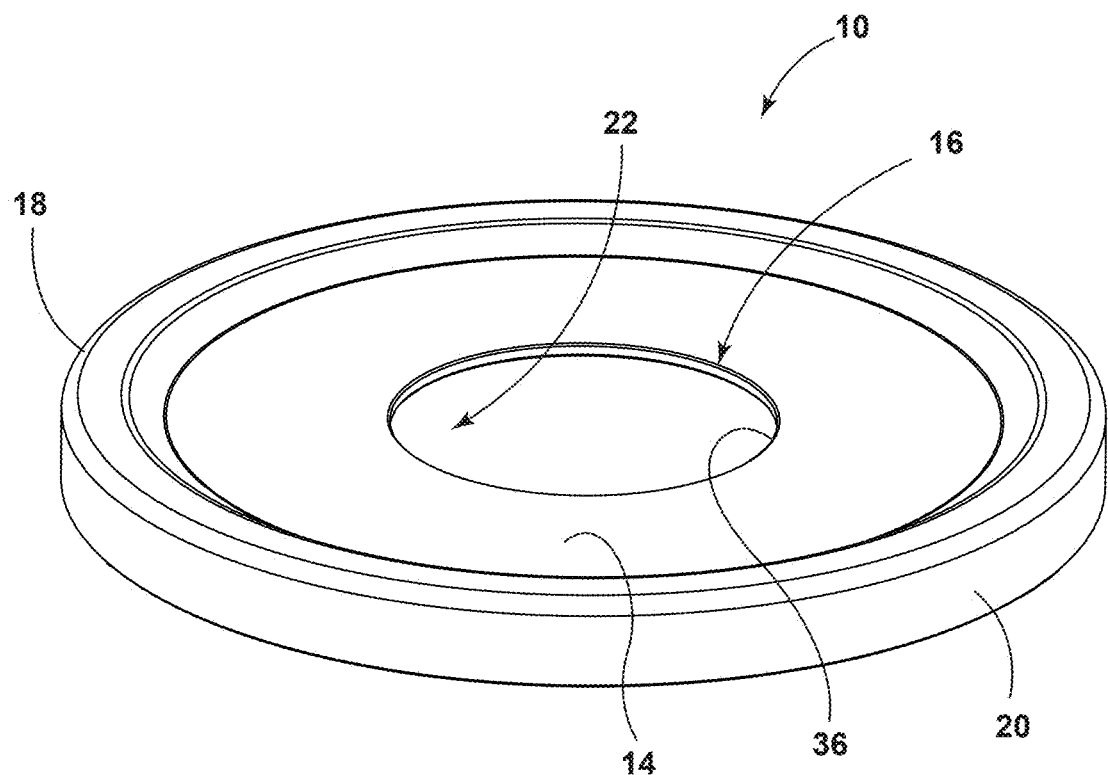
FIG. 1 is a perspective view of a dust cover for a stand mixer bowl according to an aspect of the disclosure.

The components in the figures are not necessarily to scale, emphasis instead being placed upon illustrating the principles described herein.

DETAILED DESCRIPTION

The present illustrated embodiments reside primarily in combinations of apparatus components related to a stand mixer appliance. Accordingly, the apparatus components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that an article or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-5, reference numeral 10 generally designates a dust cover for a stand mixer bowl 12. The dust cover 10 includes a disc-shaped body 14 defining a central aperture 16 therethrough and extending from the central aperture 16 to an outer extent 18 and a rim 20 extending from the outer extent 18 of the disc-shaped body 14 to define an interior portion 22 of the dust cover 10 with the disc-shaped body 14. The interior portion 22 of the dust cover 10 is configured to removably receive an upper portion 24 of the mixing bowl 12 with the disc-shaped body 14 extending inwardly from a lip 26 of the mixing bowl 12 positioned adjacent the outer extent 18 of the disc-shaped body 14 over at least a portion of an interior 28 of the mixing bowl 12. The central aperture 16 is configured for a portion of a planetary hub 30 of a stand mixer 32 to extend therethrough with an outer surface 34 of the portion of the planetary hub 30 adjacent an inner edge 36 of the central aperture 16 when the dust cover 10 receives the upper portion 24 of the mixing bowl 12 when the mixing bowl 12 is coupled to the stand mixer 32 in a storage position thereof.

Figure 2:
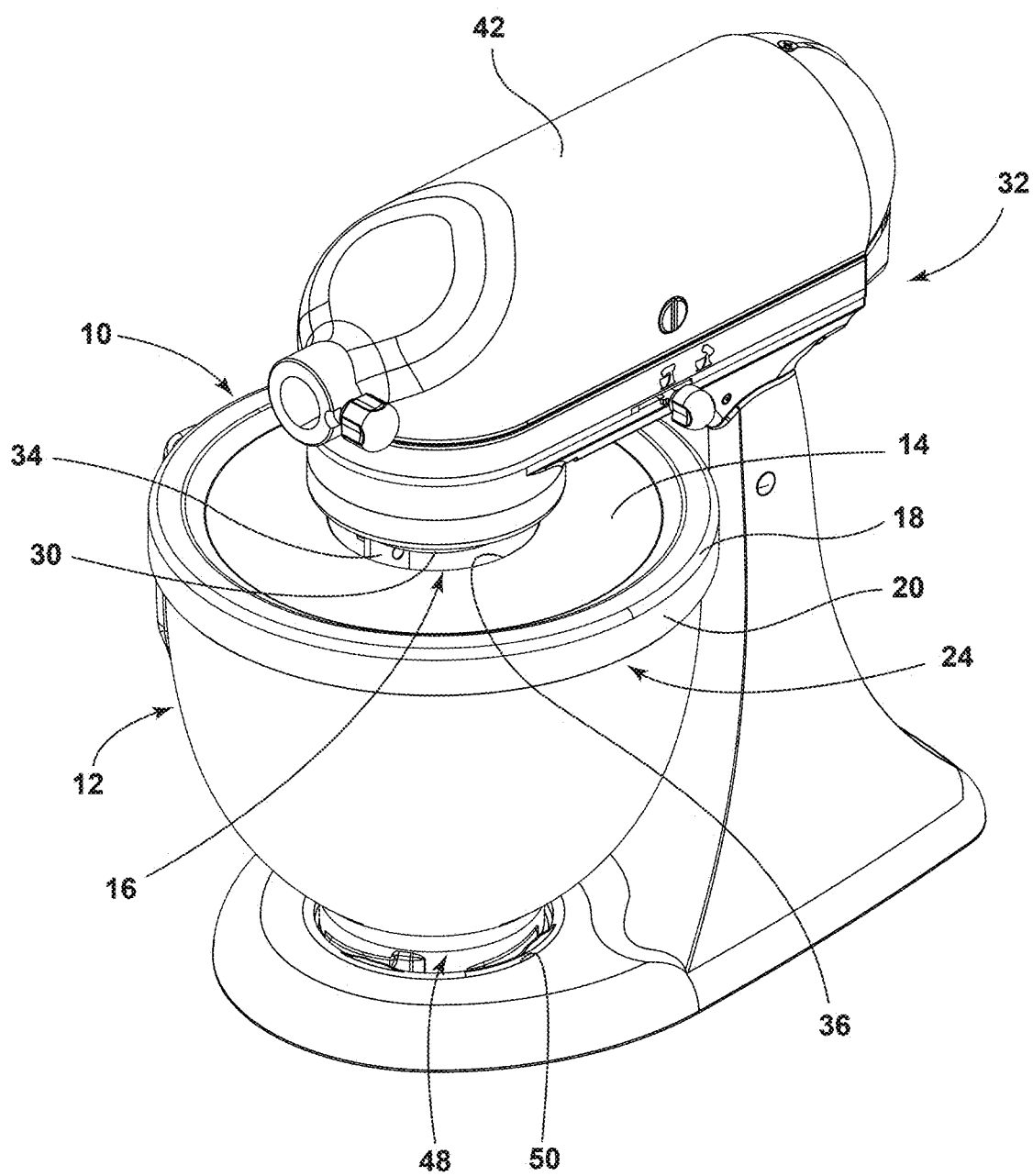
FIG. 2 is a perspective view of the dust cover of FIG. 1 in place on a mixing bowl coupled with a stand mixer in a storage condition of the mixing bowl.
Figure 3:
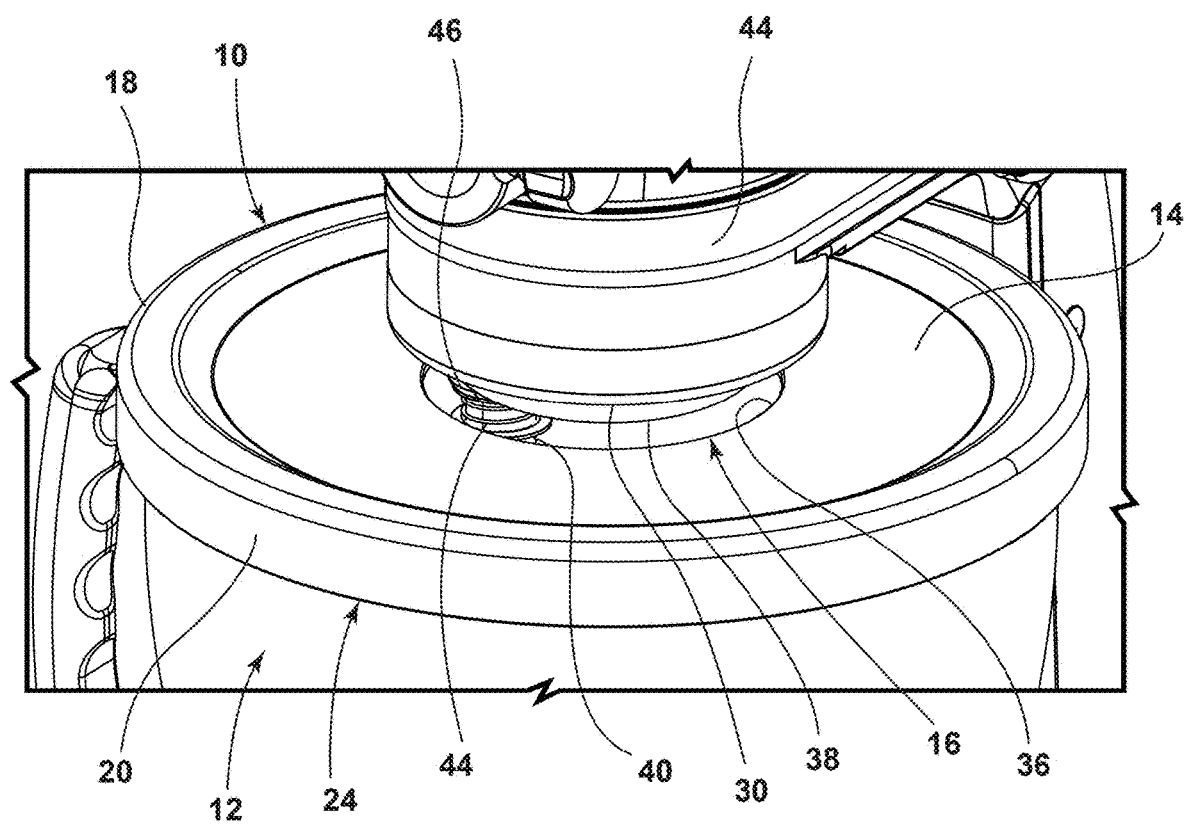
FIG. 3 is a detail view of an interface between the mixing bowl and a portion of the stand mixer in the storage condition of FIG. 2.

As particularly shown in FIGS. 2 and 3, the central aperture 16 of the dust cover 10 is present and configured to allow the dust cover 10 to be used in connection with the mixing bowl 12 when in place on the stand mixer 32. In the illustrated example, the mixing bowl 12 is configured such that the lip 26 thereof is positioned in horizontal alignment with a portion of the planetary hub 30 of the stand mixer 32. As can be appreciated, the planetary hub 30 includes a hub body 38 and an output shaft 40 and is configured such that the hub body 38 rotates along an orbital path that generally corresponds with the shape of the hub body 38. The output shaft 40 moves along the orbital path of the hub body 38 while itself rotating (including, in one implementation, in an opposite direction) in a planetary motion due to its offset position within the hub body 38. In this manner, depending on the height of the mixing bowl 12 and the particular configuration of the body 14 of the dust cover 10, the planetary hub 30 can be received through the aperture 16, to varying degrees, to allow the stand mixer 32 to be stored, for example, with a mixing head 42 of the stand mixer 32 in the lowered position (to further save space, as the stand mixer 32 is generally more compact with the mixing head 42 lowered, as opposed to raised). In this manner, the inner edge 36 of the aperture 16 may horizontally align, in particular, with the output shaft 40 or the hub body 38. In either configuration, the aperture 16 is sized to allow the output shaft 40 to wholly or partially extend therethrough and into the interior 28 of the mixing bowl 12.

Because the position of the output shaft 40 moves with the orbital rotation of the hub body 38, the aperture 16 can be sized to allow the output shaft 40 to pass therethrough throughout the range of motion thereof with additional clearance to allow for tolerance stack-up and ease of operation. In one respect, the clearance provided (i.e., the distance between the inner edge 36 of the aperture 16 and the adjacent outermost portion 34 of the planetary hub 30, which may be defined on the output shaft 40, as shown, or on the hub body 38) can allow for location and or movement of any attachment structure 44 positioned on the output shaft 40. In a further aspect, the aperture 16 can be sized to accommodate the hub body 38 therein, which may have a widest point along a collar 46 from which the output shaft 40 extends. Again, as the positon of the collar 46 may vary when the stand mixer 32 is powered off for storage, the aperture 16 can be sized to allow clearance for the collar 46. In one implementation, the aperture 16 can have a radius that is at least 3 mm greater than the distance from the outermost position along the collar 46 to a rotational center of the planetary hub 30. As shown, the body 14 of the dust cover 10 can be somewhat concave such that there is vertical clearance between the mixing head 42 and the dust cover 10, particularly when used with taller implementations of the mixing bowl 12, as shown in FIGS. 1-3.

As discussed, the central aperture 16 can be sized to correspond with an outer path of the outermost adjacent surface portion 34 of the planetary output hub 30 through an operational range of motion thereof. In this respect, the relevant portion 34 of the planetary hub 30 can vary between the hub body 38 and the output shaft 40 and may, further vary in the case of the output hub 30 as the output hub 30 rotates about its axis, as such portion 34 is, in at least one aspect, determined by its closest proximity to the inner edge 36 of the central aperture 16. In one aspect, the fit between the planetary hub 30 and the aperture 16, while being configured for reliable and convenient for use during storage of the mixing bowl 12 on the stand mixer 32, can be unsuited for use as a "splash guard" during use of the mixing bowl 12 with the stand mixer 32. In this respect, the fit between the central aperture 16 and the relevant portion 34 of the planetary hub 30 can be close enough that the central aperture 16 is within an operational tolerance of the outer path of the surface 34 of the planetary hub 30 within at least a portion of the operational range of motion thereof. In this respect, the rotation of the hub body 38 and the output shaft 40 under load, while mixing ingredients and/or food product(s) may cause the position of the surface 34 to vary by more than the operational path alone. This additional variance can be anticipated with respect to ordinary operation of the stand mixer 32, including with a designated splash guard, but the distance between the surface portion 34 of the planetary hub 30 and the inner edge 36 of the central aperture 16 may be within such anticipated variation, such that interference may result if the dust cover 10 is left in place on the mixing bowl 12 during use of the same with the stand mixer 32. In another aspect, the central aperture 16 may be positioned beneath the mixing head 42, such that the introduction of ingredients through the central aperture 16 is impeded. In one implementation, the outer surface 34 of the planetary output hub 30 can be within about 3 mm of the inner edge 36 of the central aperture 16 when the dust cover 10 is in place on the mixing bowl 12 and the mixing bowl 12 is mounted with the stand mixer 32. In a further aspect, The central aperture 16 can have a radius of 40 mm or about 40 mm (e.g., +/−5%).

As further shown in FIG. 2, the mixing bowl 12 includes a base 48 configured for mounting with a bowl coupling 50 of the stand mixer 32. In one implementation, the bowl coupling 50 can be a twist-fit (also referred to as a bayonet-style) fitting, where the base 48 is positioned within the bowl coupling 50 and turned (e.g. one-quarter turn clockwise or anti-clockwise) to secure the mixing bowl 12 in place. In other implementations, the present dust cover 10 can be interchangeably used with a bowl-lift type mixer and the related compatible mixing bowl. As shown, the body 14 of the mixing bowl 12 extends upward from the base 48 to the upper portion 24 thereof, where the lip 26 is located. In this manner, the dust cover 10 can be useable in an assembly with the depicted mixing bowl 12 and in a further assembly with the mixing bowl 12 and the stand mixer 32 in a storage position of the assembled mixing bowl 12 and stand mixer 32. The dust cover 10 is, accordingly, removable from the mixing bowl 12 for use of the stand mixer 32 in connection with the mixing bowl 12. In one example, this can be accomplished without removing the mixing bowl 12 from the stand mixer 32 by tilting the mixing head 42 upward such that the planetary hub 30 is removed from the central aperture 16, at which point the dust cover 10 can be lifted off of the upper portion 24 of the mixing bowl 12 and stored on its own or in connection with any other mixing bowls or items stored within the utilized mixing bowl 12. Other use cases may be realized by the utilization of different mixing bowls and different storage combinations thereof.

Figure 4:
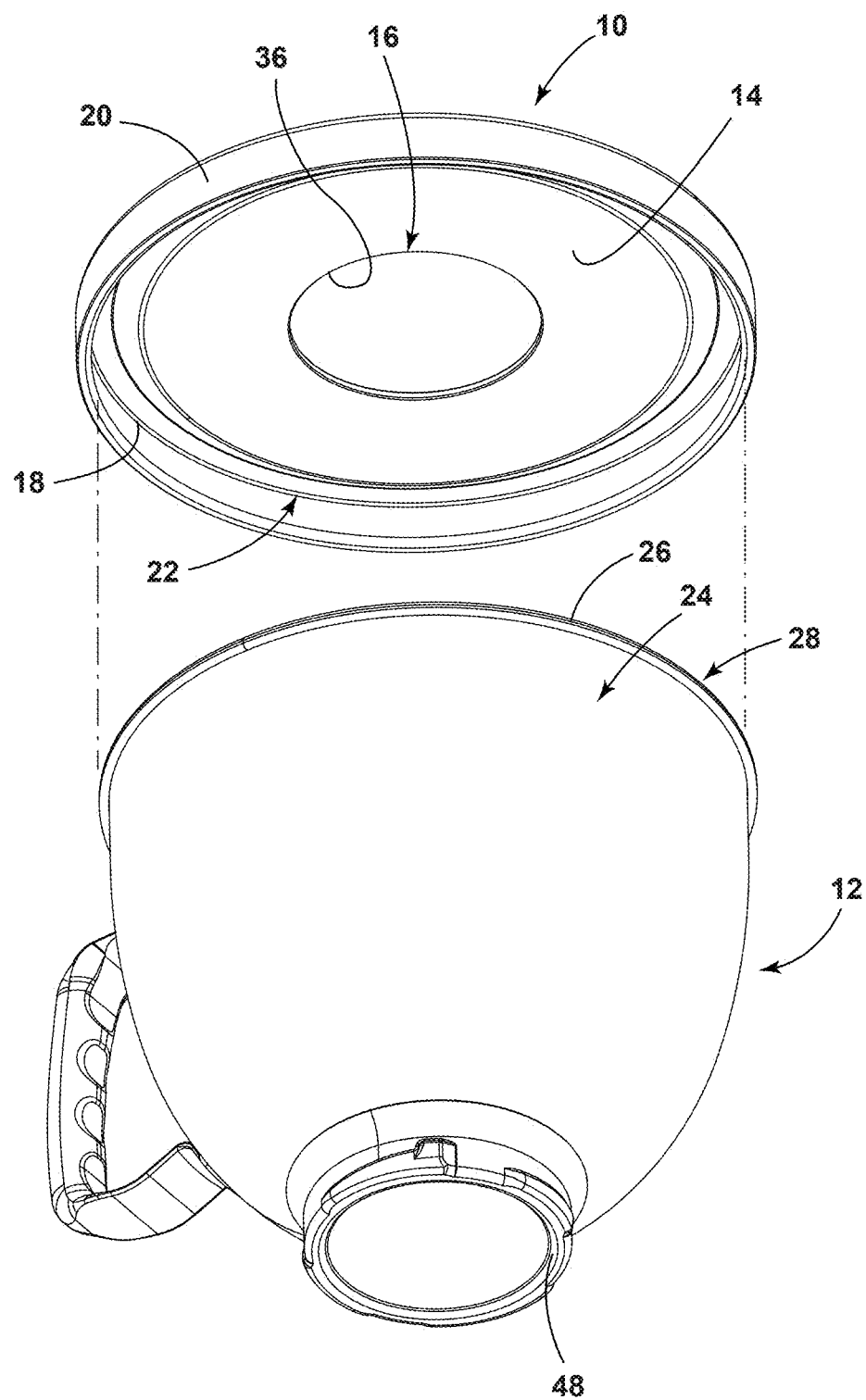
FIG. 4 is a bottom perspective assembly view of the dust cover and the mixing bowl.
Figure 5:
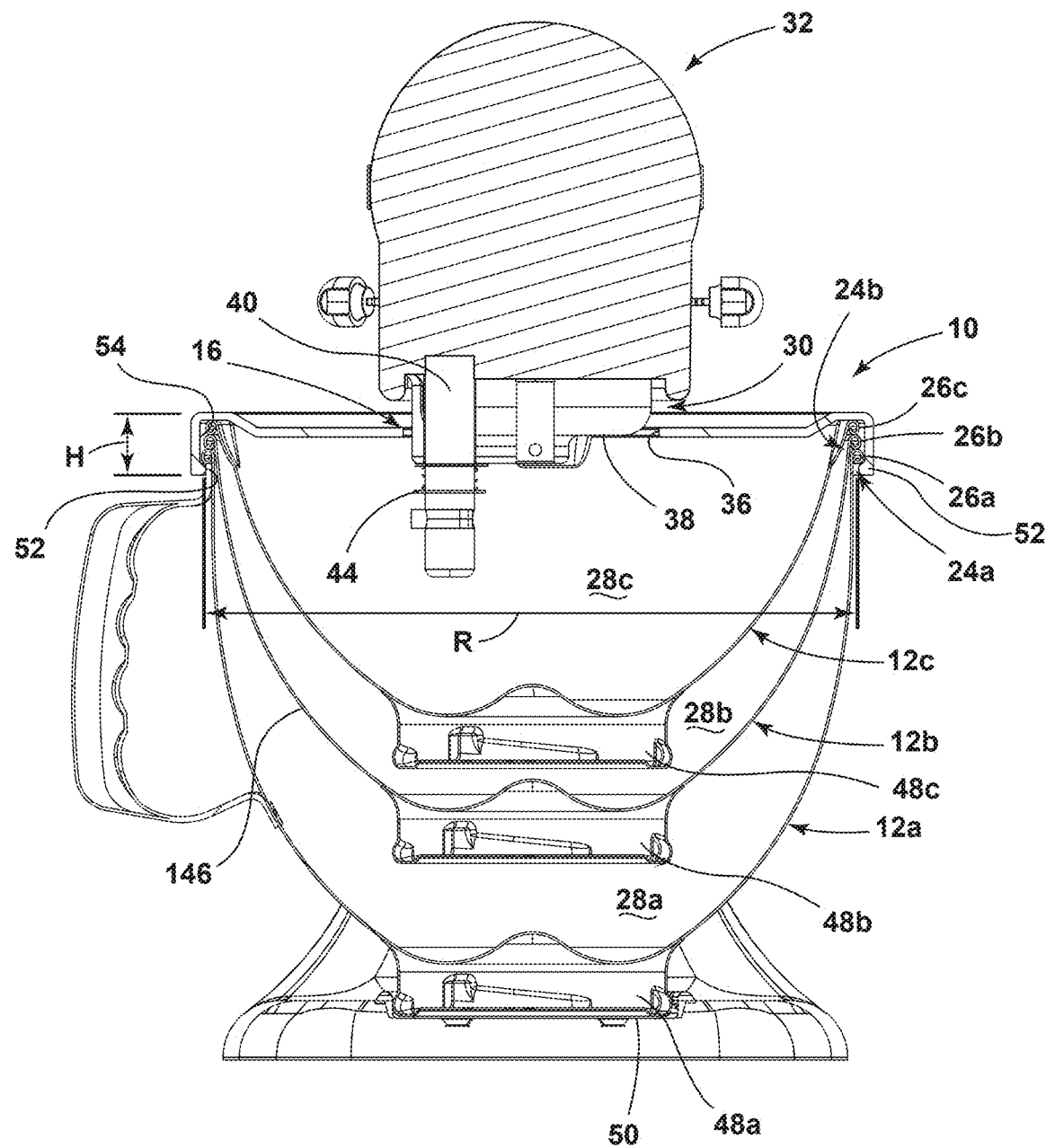
FIG. 5 is a cross-section view of the dust cover in a further use condition in connection with an assembly of nested mixing bowls.

As particularly shown in FIG. 4, the rim 20 can extend away from the body 14 of the dust cover 10 by a distance greater than the height of the lip 26 of a compatible mixing bowl 12. In one aspect, this can generally facilitate resting of the dust cover 10 on the mixing bowl 12 with reliable enough positioning to allow movement of the assembled dust cover 10, mixing bowl 12 and stand mixer 32, while allowing the dust cover 10 to be useable with mixing bowls 12 with varying lip 26 height or other configurations. In a particular aspect, shown in FIG. 5, the previously-described mixing bowl 12 can be a first mixing bowl 12a and the lip 26 and interior cavity 28 can be, respectively, a first lip 26a and a first interior cavity 28a of the first mixing bowl 12a. In this respect, an implementation of the above-described assemblies can further include a second mixing bowl 12b having a second body 14b extending to a second lip 26b to define a second interior cavity 28b with the second body 14b of the second mixing bowl 12b being received within the first mixing bowl 12a with the second rim 20b in supporting contact with the first rim 20a of the first mixing bowl 12a. In this arrangement, respective upper portions 24a and 24b of both the first and second mixing bowls 12a and 12b can be received within the interior portion 22 of the dust cover 10. The rim 20 of the dust cover 10 can extend away from the body 14 to a first distance D that is greater than a height of the upper lip 26a of the mixing bowl 12b such that a portion of the rim 20 can engage with the first lip 26a of the first mixing bowl 12a over the second lip 26b of the second mixing bowl 12b.

As further shown the rim 20 can further accommodate a third mixing bowl 12c similarly positioned within the interior 28b of the second mixing bowl 12b with the lip 26c of the third mixing bowl 12c resting on the lip 26b of the second mixing bowl 12b. For compatibility with this arrangement of mixing bowls 12a, 12b, and 12c, for example, the rim 20 can extend away from the body 14 of the dust cover 10 such that the first distance H is at least three times greater than a height of an upper lip 26a of the mixing bowl 12a such that a portion of the rim 20, including a detent feature 52 thereof, can engage with the lip 26a of the lowermost mixing bowl 12a when the two additional mixing bowls 12b and 12c are nested within the outermost mixing bowl 12a with the respective lips 26b and 26c thereof in a stacked arrangement with the lip 26a of the mixing bowl 12a. In one aspect, the inner surface 54 of the rim 20 can have a radius R that provides a loose, sliding fit with the mixing bowl 12a. In other aspects, the detent feature 52 can extend around all or a portion of the inner surface 54 of the rim 20 to facilitate a snap-fit engagement with the mixing bowl 12a, which may help to retain the assembly of the mixing bowl 12a and the depicted additional mixing bowls 12b and 12c together during storage and/or movement of the assembly. In a particular implementation, the radius R can be about of 115 mm (+/−5%) to fit on a similarly-sized mixing bowl 12a (e.g., having a radius of between about 113 mm and 114.5 mm).

The invention disclosed herein is further summarized in the following paragraphs and is further characterized by combinations of any and all of the various aspects described therein.

According to another aspect of the present disclosure, a dust cover for a stand mixer bowl includes a disc-shaped body defining a central aperture therethrough and extending from the central aperture to an outer extent and a rim extending from the outer extent of the disc-shaped body to define an interior portion of the dust cover with the disc-shaped body. The interior portion of the dust cover is configured to removably receive an upper portion of a mixing bowl with the disc-shaped body extending inwardly from a lip of the mixing bowl positioned adjacent the outer extent of the disc-shaped body over at least a portion of an interior of the mixing bowl. The central aperture is configured for a portion of a planetary hub of a stand mixer to extend therethrough with an outer surface of the portion of the planetary hub adjacent an inner edge of the central aperture when the dust cover receives the upper portion of the mixing bowl when the mixing bowl is coupled to the stand mixer in a storage position thereof. The central aperture can be sized to correspond with an outer path of the surface of the planetary output hub through an operational range of motion thereof.

The central aperture can be sized to be within an operational tolerance of the outer path of the surface of the planetary output hub within at least a portion of the operational range of motion thereof.

The outer surface of the planetary output shaft can be within about 3 mm of an inner edge of the central aperture when the dust cover receives the upper portion of the mixing bowl.

The central aperture can have a radius of 40 mm.

An inner surface of the rim can have a radius of 115 mm.

The rim can extend away from the disc-shaped body to a first distance that is at least three times greater than a height of an upper lip of the mixing bowl such that a portion of the rim can engage with the lip of the mixing bowl when a first and a second additional mixing bowl are nested within the mixing bowl with respective lips thereof in a stacked arrangement with the lip of the mixing bowl.

According to yet another aspect, a mixing bowl assembly for use with a stand mixer includes a mixing bowl having a body extending to a lip and defining an interior cavity and a dust cover having a disc-shaped body defining a central aperture therethrough and extending from the central aperture to an outer extent and a rim extending from the outer extent of the disc-shaped body to define an interior portion of the dust cover with the disc-shaped body. An upper portion of the mixing bowl is received within the interior portion of the dust cover, with the disc-shaped body extending inwardly from the lip of the mixing bowl positioned adjacent the outer extent of the disc-shaped body, over at least a portion of an interior of the mixing bowl. The central aperture is configured for a portion of a planetary hub of a stand mixer to extend therethrough into the interior cavity of the mixing bowl with an outer surface of the portion of the planetary hub adjacent an inner edge of the central aperture when the dust cover receives the upper portion of the mixing bowl and the mixing bowl is coupled to the stand mixer in a storage position thereof.

The mixing bowl can include a base configured for mounting with a bowl coupling of the stand mixer, the body of the mixing bowl extending from the base.

The dust cover can be removable from the mixing bowl for use of the stand mixer in connection with the mixing bowl.

The mixing bowl can be a first mixing bowl and the lip and interior cavity can be, respectively, first and second interior cavities of the first mixing bowl, and the assembly can further include a second mixing bowl having a second body extending to a second lip to define a second interior cavity, the second body of the second mixing bowl being received within the first mixing bowl with the second rim in supporting contact with the first rim of the first mixing bowl.

Upper portions of both the first and second mixing bowls can be received within the interior portion of the dust cover.

The rim of the dust cover can extend away from the disc-shaped body to a first distance that is greater than a height of an upper lip of the mixing bowl such that a portion of the rim can engage with the first lip of the first mixing bowl over the second lip of the second mixing bowl.

The central aperture of the dust cover can be sized to correspond with an outer path of the surface of the planetary output hub through an operational range of motion thereof.

The central aperture can be sized to be within an operational tolerance of the outer path of the surface of the planetary output hub within at least a portion of the operational range of motion thereof.

The outer surface of the planetary output shaft can be within about 3 mm of an inner edge of the central aperture when the mixing bowl is coupled with the base of the stand mixer.

The central aperture can have a radius of 40 mm.

An inner surface of the rim can have a radius of 115 mm.

According to yet another aspect, a stand mixer includes a base having a bowl coupler, a mixing head coupled with the base and having an output hub extending therefrom, a mixing bowl having a base removably coupled with the bowl coupler and a body extending from the base to a lip and defining an interior cavity, and a dust cover. The dust cover has a disc-shaped body defining a central aperture therethrough and extending from the central aperture to an outer extent and a rim extending from the outer extent of the disc-shaped body to define an interior portion of the dust cover with the disc-shaped body. An upper portion of the mixing bowl is received within the interior portion of the dust cover, with the disc-shaped body extending inwardly from the lip of the mixing bowl positioned adjacent the outer extent of the disc-shaped body, over at least a portion of an interior of the mixing bowl. The central aperture is configured for a portion of the planetary hub to extend therethrough into the interior cavity of the mixing bowl with an outer surface of the portion of the planetary hub adjacent an inner edge of the central aperture.

The mixing bowl can be a first mixing bowl and the lip and interior cavity can be, respectively, first and second interior cavities of the first mixing bowl, and the stand mixer can further include a second mixing bowl having a second body extending to a second lip to define a second interior cavity, the second body of the second mixing bowl being received within the first mixing bowl with the second rim in supporting contact with the first rim of the first mixing bowl.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A mixing bowl assembly for use with a stand mixer, comprising:
   a first mixing bowl including a body extending to a first lip and defining a first interior cavity;
   a second mixing bowl including a second body extending to a second lip to define a second interior cavity, the second body of the second mixing bowl being received within the first mixing bowl with a second rim in supporting contact with the first lip of the first mixing bowl; and
   a dust cover, including:
      a disc-shaped body defining a central aperture therethrough and extending from the central aperture to an outer extent; and
      a rim extending from the outer extent of the disc-shaped body to define an interior portion of the dust cover with the disc-shaped body;
   wherein:
      an upper portion of the first mixing bowl and an upper portion of the second mixing bowl are received within the interior portion of the dust cover, with the disc-shaped body extending inwardly from the second lip of the second mixing bowl positioned adjacent the outer extent of the disc-shaped body over at least a portion of an interior of the mixing bowl;
      the rim of the dust cover extends away from the disc-shaped body to a first distance that is greater than a height of an upper lip of the mixing bowl such that a portion of the rim can engage with the first lip of the first mixing bowl over the second lip of the second mixing bowl; and
      the central aperture is configured for a portion of a planetary hub of the stand mixer to extend therethrough into the interior cavity of the mixing bowl with an outer surface of the portion of the planetary hub adjacent an inner edge of the central aperture when the dust cover receives the upper portion of the mixing bowl and the mixing bowl is coupled to the stand mixer in a storage position thereof.

2. The mixing bowl assembly of claim 1, wherein the mixing bowl includes a base configured for mounting with a bowl coupling of the stand mixer, the body of the mixing bowl extending from the base.

3. The mixing bowl assembly of claim 1, wherein the dust cover is removable from the mixing bowl for use of the stand mixer in connection with the mixing bowl.

4. The mixing bowl assembly of claim 1, wherein the central aperture of the dust cover is sized to correspond with an outer path of the surface of the planetary output hub through an operational range of motion thereof.

5. The mixing bowl assembly of claim 4, wherein the central aperture is sized to be within an operational tolerance of the outer path of the surface of the planetary output hub within at least a portion of the operational range of motion thereof.

6. The mixing bowl assembly of claim 1, wherein the outer surface of the hub is within about 3 mm of the inner edge of the central aperture when the mixing bowl is coupled with the stand mixer.

7. The mixing bowl assembly of claim 1, wherein the central aperture has a radius of 40 mm.

8. The mixing bowl assembly of claim 1, wherein an inner surface of the rim has a radius of 115 mm.

9. The mixing bowl assembly for use with a stand mixer of claim 1, wherein:
   a portion of the disc-shaped body rests on the second lip of the second mixing bowl with the rim extending downwardly past the second lip to engage with the first lip of the first mixing bowl; and
   the rim of the dust cover defines a detent feature that is configured for a snap fit engagement over the first lip with the second lip captured between the first lip and a portion of the disc-shaped body adjacent the rim to retain the first and second mixing bowls in an assembly with the dust cover.

10. The mixing bowl assembly for use with a stand mixer of claim 1, further including a third mixing bowl having a third body extending to a third lip to define a third interior cavity, the third body of the third mixing bowl being received within the second mixing bowl with a third rim in supporting contact with the first lip of the first mixing bowl; wherein:
   an upper portion of the third mixing bowl is further received within the interior portion of the dust cover with the respective upper portions of the first and second mixing bowls; and
   the first distance is further such that the portion of the rim can engage with the first lip of the first mixing bowl over the second lip of the second mixing bowl and the third lip of the third mixing bowl with the third lip in contact with a portion of the disc-shaped body.

11. A stand mixer, comprising:
   a base including a bowl coupler;
   a mixing head coupled with the base and including an output hub extending therefrom;
   a first mixing bowl including a base removably coupled with the bowl coupler and a first body extending from the base to a first lip and defining a first interior cavity;
   a second mixing bowl including a second body extending to a second lip to define a second interior cavity, the second body of the second mixing bowl being received within the first mixing bowl with the second rim in supporting contact with the first rim of the first mixing bowl; and
   a dust cover, including:
      a disc-shaped body defining a central aperture therethrough and extending from the central aperture to an outer extent; and
      a rim extending from the outer extent of the disc-shaped body to define an interior portion of the dust cover with the disc-shaped body;
   wherein:
      respective upper portions of the first mixing bowl and second mixing bowl are received within the interior portion of the dust cover, with the disc-shaped body extending inwardly from the first lip of the first mixing bowl positioned adjacent the outer extent of the disc-shaped body over at least a portion of the first interior cavity of the first mixing bowl; and
      the central aperture is configured for a portion of the planetary hub to extend therethrough into the interior cavity of the mixing bowl with an outer surface of the portion of the planetary hub adjacent an inner edge of the central aperture.

12. The stand mixer of claim 11, further including a third mixing bowl having a third body extending to a third lip to define a third interior cavity, the third body of the third mixing bowl being received within the second mixing bowl with a third rim in supporting contact with the first lip of the first mixing bowl; wherein:

an upper portion of the third mixing bowl is further received within the interior portion of the dust cover with the respective upper portions of the first and second mixing bowls; and the first distance is further such that the portion of the rim can engage with the first lip of the first mixing bowl over the second lip of the second mixing bowl and the third lip of the third mixing bowl with the third lip in contact with a portion of the disc-shaped body.

* * * * *